No. 788,270. PATENTED APR. 25, 1905.
G. D. LUCE.
CANE HARVESTER.
APPLICATION FILED JAN. 6, 1905.
3 SHEETS—SHEET 1.
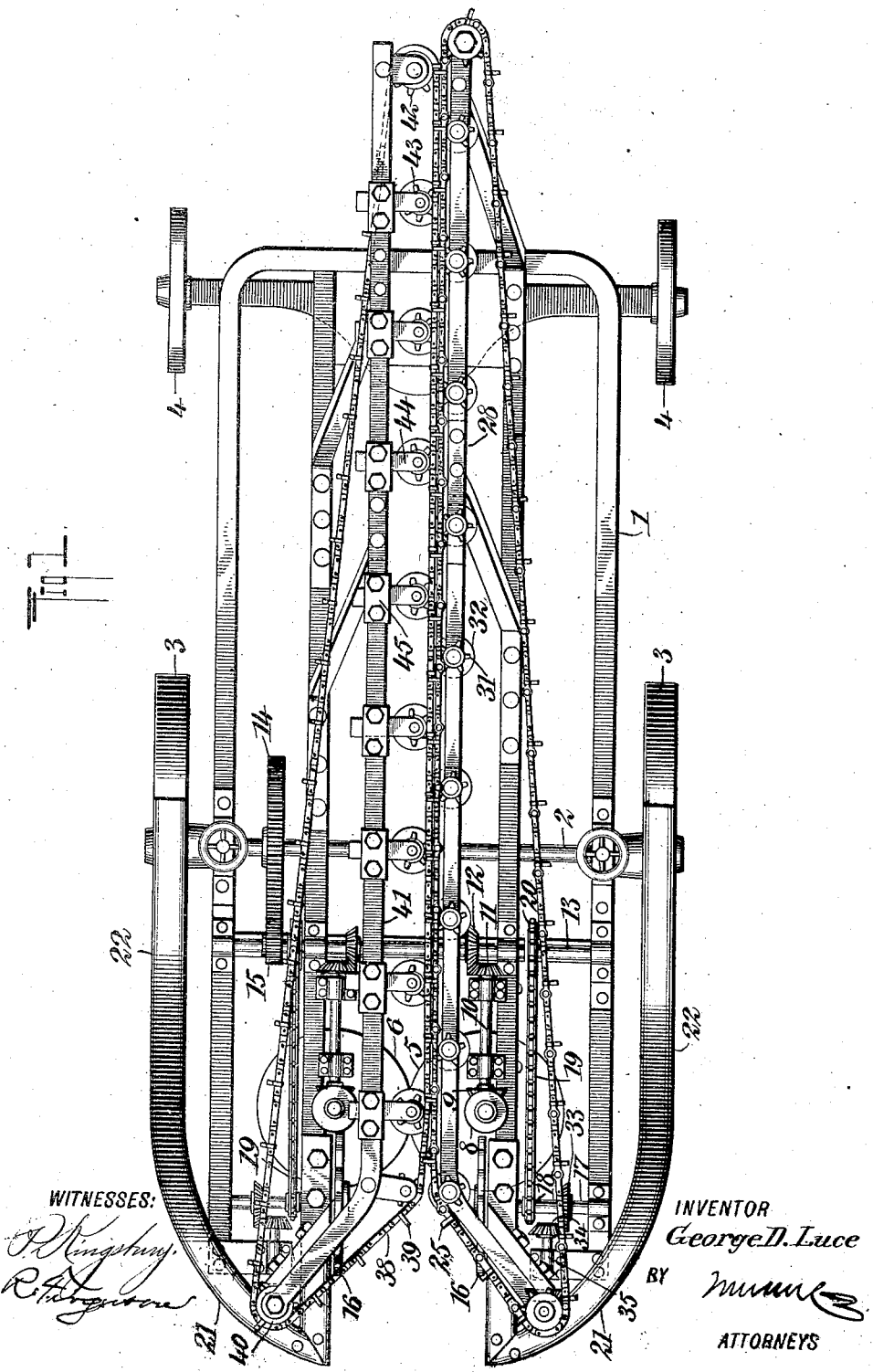
WITNESSES:
INVENTOR
George D. Luce
BY
ATTORNEYS

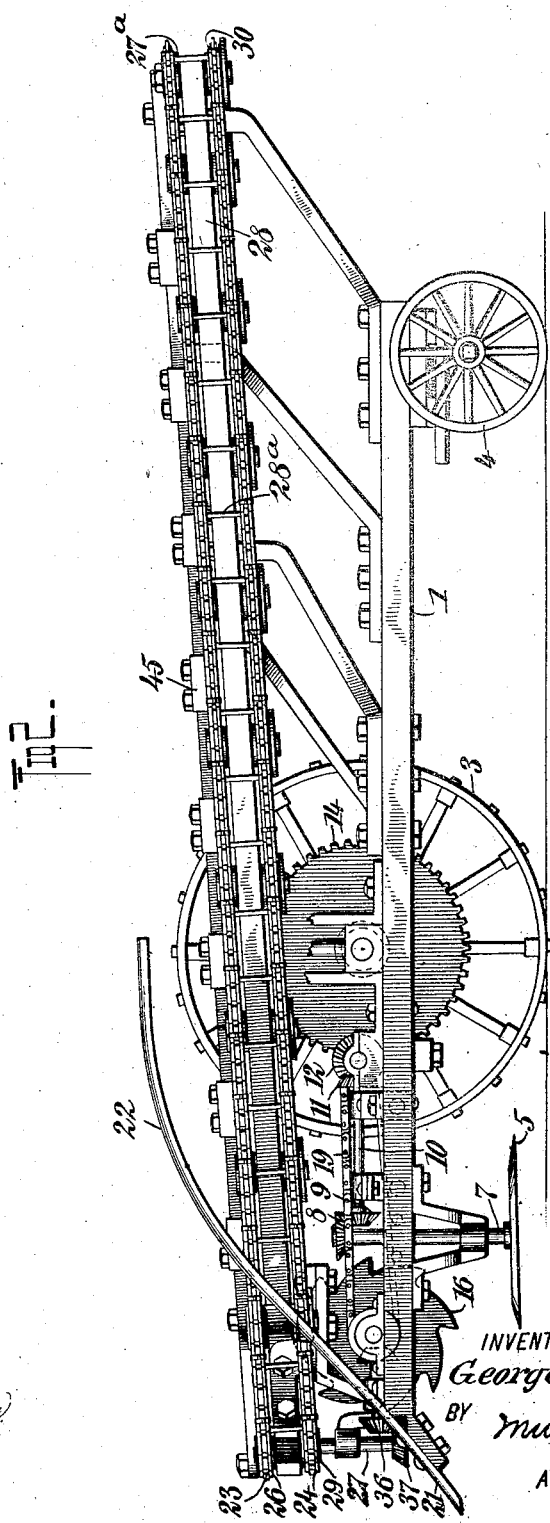

No. 788,270. PATENTED APR. 25, 1905.
G. D. LUCE.
CANE HARVESTER.
APPLICATION FILED JAN. 6, 1905.
3 SHEETS—SHEET 3.
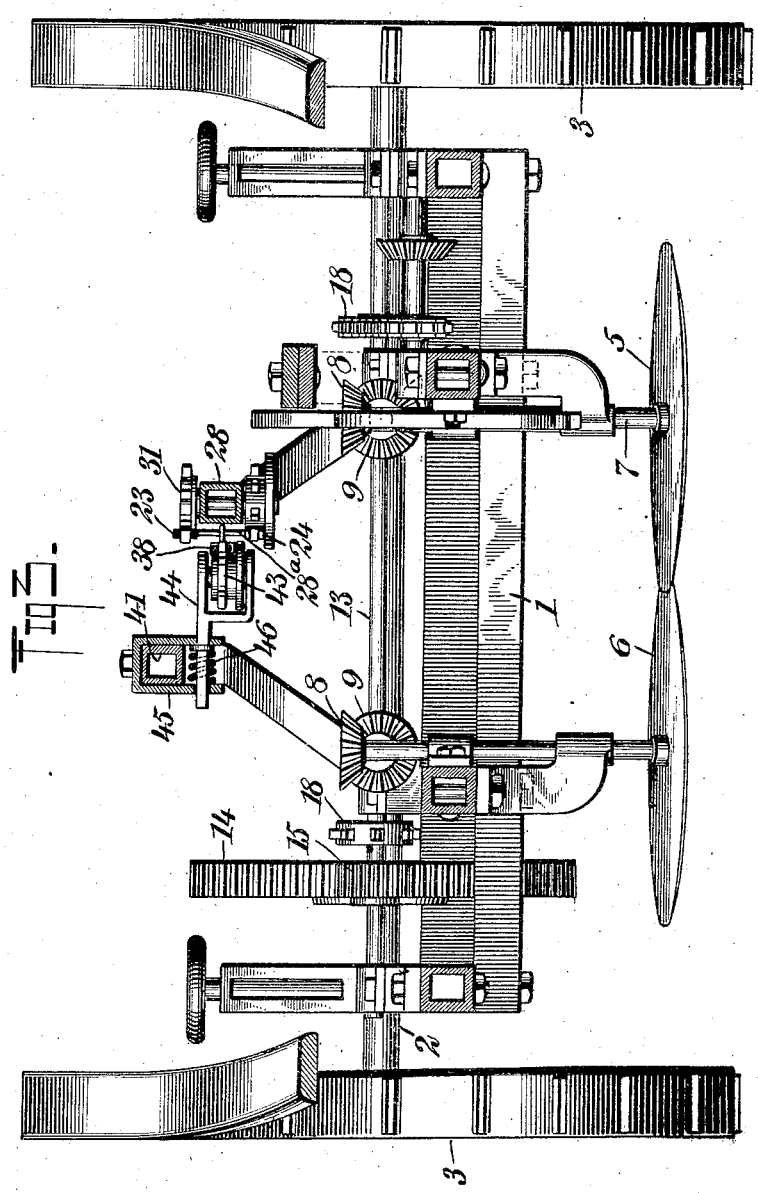
WITNESSES:
INVENTOR
George D. Luce
BY
ATTORNEYS No. 788,270.

Patented April 25, 1905.

UNITED STATES PATENT OFFICE.

GEORGE D. LUCE, OF NEW ORLEANS, LOUISIANA.

CANE-HARVESTER.

SPECIFICATION forming part of Letters Patent No. 788,270, dated April 25, 1905.

Application filed January 6, 1905. Serial No. 239,843.

*To all whom it may concern:*

Be it known that I, GEORGE D. LUCE, a citizen of the United States, and a resident of New Orleans, in the parish of Orleans and State of Louisiana, have invented a new and Improved Cane-Harvester, of which the following is a full, clear, and exact description.

This invention relates to improvements in sugar-cane harvesters substantially of the character of the harvesters shown in the patents granted to me June 9, 1903, No. 730,671, and June 7, 1904, No. 762,073, the particular object of the invention residing in a novel form of feeding and carrying mechanism.

I will describe a cane-harvester embodying my invention and then point out the novel features in the appended claims.

Reference is to be had to the accompanying drawings, forming a part of this specification, in which similar characters of reference indicate corresponding parts in all the figures.

Figure 1 is a plan of a cane-harvester embodying my invention. Fig. 2 is a side elevation thereof, and Fig. 3 is a cross-section.

The harvester comprises a frame 1, mounted on an axle 2, to which the traction-wheels 3 are rigidly connected. At the rear end the frame is supported by wheels 4. Arranged forward of the axle 2 are the cutting-disks 5 6, which rotate in a horizontal plane and are slightly overlapped. The disk 5 is carried by a vertical shaft 7, on which is a bevel-pinion 8, meshing with a bevel-pinion 9 on a counter-shaft 10, having a bevel-pinion 11 engaging with a pinion 12 on a shaft 13, which is driven from the axle 2 through the medium of a gear-wheel 14 on the axle engaging with a pinion 15 on the shaft. The disk 6 is also driven from the axle in a similar manner to the disk 5. It is to be understood, however, that instead of the chain of gear-wheels illustrated sprocket-chains or other driving mechanism may be employed.

Arranged above the disks and forward of the same are pick-up wheels 16, said wheels being provided with teeth designed to engage with cane that may be flattened out or lying down, so as to raise the same and pass it between the carriers, to be hereinafter described.

The pick-up wheels 16 are mounted on horizontal shafts 17, on which are sprocket-wheels 18, engaged by sprocket-chains 19, said sprocket-chains also engaging with sprocket-wheels 20 on the shaft 13.

Extended forward from the frame and downward at inward curves are dividers 21, which have rearward and upward extensions 22, forming guards over the wheels 3. These several features are similar to the devices shown in my Patent No. 762,073, above referred to.

As before stated, the essential feature of the present invention consists of the means for carrying the cane to the cutters and then moving it rearward and discharging in windrows at the back of the machine, this mechanism comprising at one side a pair of endless chains 23 24, arranged one above the other, and each chain has fingers 25. The chain 23 passes around a sprocket-wheel 26 at the forward end and mounted on a shaft 27, and at its rear end the said chain engages with a sprocket-wheel 27$^a$, mounted on a bar 28, supported above the main frame 1. The lower chain 24 engages with a sprocket-wheel 29 on the said shaft 27 and also engages with a sprocket-wheel 30 at the rear end of the bar 28. Supported by the bar 28 and engaging with the inner stretches of the carrier-chains are idler-sprockets 31, and below the several idler-sprockets are disks 32, which will prevent the chains from sagging downward. The two chains are operated by means of a bevel-pinion 33, mounted on the shaft 17 and engaging with a pinion 34 on a shaft 35, which has a pinion 36 engaging with a pinion 37 on the shaft 27. Opposite the pair of chains and having its inner stretch movable between said pair of chains is a single endless chain 38, provided with fingers 39. This chain 38 engages with a sprocket-wheel 40, having its shaft-bearings in a bar 41, extended above the main frame 1 and parallel with the bar 28. At its rear end the chain 38 engages with a sprocket-wheel 42, having its shaft-bearings in an arm supported by said bar 41. It will be seen that the chains 23 and 24 are connected together by vertical rods 28$^a$, which will prevent sagging of the long stretches of the chains and also prevent them from leaving the sprocket-idlers.

Arranged between the end sprocket-wheels are idler-sprockets 43. Each one of these intermediate sprockets 43 is mounted on an arm 44, extended through a boxing 45, supported on the bar 41, and arranged around the arms within the boxing are springs 46, which serve to press the chain 38 against the cane carried between said chain and the pair of chains. By these spring-yielding idlers it is obvious that single cane-shoots may be carried or bunches of cane may be carried and discharged at the rear end of the machine. This single chain 38 is driven in a similar manner to the pair of chains already described. It will be noted that the forward ends of the bars 28 and 41 are divergent, so that the cane may be guided between the carrier-chains.

In the operation as the machine moves forward the cane will pass between divergent portions of the chain and be carried to the cutters, and then the cut cane will be moved rearward while in upright position and discharged in windrows, and the cane will be carried over the rear end of the frame or lifted above the same as the carrier-chains are inclined upward toward the rear, as indicated in Fig. 2.

Having thus described my invention, I claim as new and desire to secure by Letters Patent—

1. In a cane-harvester, a feeding and carrying mechanism comprising a pair of endless chains arranged one above the other, connecting-bars at intervals along said chains, an endless chain for engaging the cane at the opposite side of that engaged by the pair of chains and between the same, and means for operating the chains.

2. In a cane-harvester, a feeding and carrying mechanism comprising a pair of chains arranged one above the other, sprocket-wheels with which said chains engage, idler-sprockets for engaging with the inner stretches of the chains, an opposing chain having its inner stretch arranged to move between the pair of chains, sprocket-wheels with which said single chain engages, and yielding idlers with which the inner stretch of said single chain engages.

3. In a cane-harvester, a wheel-mounted frame, bars extended above the frame and lengthwise thereof, pairs of sprocket-wheels carried by one of said bars, chains engaging with said sprocket-wheels, idler-sprockets supported by the bar and engaging with the inner stretches of said chains, sprocket-wheels in the other of said bars, a carrier-chain engaging therewith, spring-pressed idlers supported by said other bar and engaging with the inner stretch of the last-named chain, and driving connections between the axle of the machine and the forward sprocket-wheels.

4. In a cane-harvester, a wheel-mounted main frame, bars extended lengthwise of the frame and above the same, the forward ends of said bars being divergent, cutting devices carried by the frame, pick-up devices carried by the frame, a pair of endless chains supported by one of the bars, one above the other, a chain supported by the other of said bars and arranged to pass between the pair of chains, spring-pressed idlers for the last-named chain, and means for imparting motion to the chain.

5. In a cane-harvester, a wheel-supported main frame, bars extended longitudinally of the same and having divergent ends, a pair of carrier-chains movable on one of the bars, one chain being arranged above the other, an endless chain carried by the other of said bars and having its inner stretch movable between the inner stretches of the first-named chains, spring-pressed idlers for engaging with the last-named chain, fingers mounted on the chains, and means actuated from the axle of the machine for moving said chains.

In testimony whereof I have signed my name to this specification in the presence of two subscribing witnesses.

GEORGE D. LUCE.

Witnesses:
ANDREW HERO, Jr.,
JNO. J. WARD.